United States Patent [19]

Mathis

[11] Patent Number: 4,730,263

[45] Date of Patent: Mar. 8, 1988

[54] METHOD AND DEVICE FOR MEASURING GAMMA RADIATION

[75] Inventor: Gary L. Mathis, Fort Worth, Tex.

[73] Assignee: Gearhart Industries, Inc., Fort Worth, Tex.

[21] Appl. No.: 708,041

[22] Filed: Mar. 4, 1985

[51] Int. Cl.⁴ .................... G01C 25/00; G06F 15/74
[52] U.S. Cl. ............................. 364/571; 324/335;
324/256; 364/421; 364/527; 364/550; 364/422;
378/70
[58] Field of Search ........... 364/420, 421, 527, 550,
364/571, 422; 250/336.1, 256, 262; 378/70, 88;
324/335

[56] References Cited

U.S. PATENT DOCUMENTS

| | | | |
|---|---|---|---|
| 3,858,037 | 12/1974 | Moore et al. | 378/88 X |
| 4,228,512 | 10/1980 | Thompson et al. | 364/527 |
| 4,228,515 | 10/1980 | Genna et al. | 364/571 |
| 4,433,240 | 2/1984 | Seeman | 250/256 |
| 4,438,495 | 3/1984 | Collins et al. | 364/571 X |
| 4,471,435 | 9/1984 | Meisner | 250/262 |
| 4,492,863 | 1/1985 | Smith, Jr. | 250/256 |
| 4,558,220 | 12/1985 | Evans | 378/88 X |
| 4,568,829 | 2/1986 | Ruckebursch | 250/256 |
| 4,578,578 | 3/1986 | Lin et al. | 250/252 |
| 4,583,187 | 4/1986 | Stoub | 364/527 X |
| 4,612,439 | 9/1986 | Chace | 250/256 |
| 4,697,078 | 9/1987 | Randall | 250/256 |

Primary Examiner—Errol A. Krass
Assistant Examiner—Kevin J. Teska
Attorney, Agent, or Firm—Felsman, Bradley & Gunter

[57] ABSTRACT

A method and device for measuring peak gamma radiation is provided wherein the method includes the steps of determining a minimum and maximum number of counts within a preselected multiple channel energy spectrum measurement range, determining a channel having approximately one-half the number of maximum counts, determining a channel representing a background energy, computing a peak energy centroid channel, computing a channel to energy conversion factor and recomputing the boundry channels for the preselected multiple channel energy spectrum measurement range. An apparatus for measuring gamma radiation is also provided that includes a device for detecting gamma radiation emmissions and producing an electrical signal of a magnitude proportional to the level of energy of the emmision connected to a converter that transmits a digital word containing the emission energy level to a computer circuit that computes the number of emissions for specific energy level channels within a first set of channel boundaries and then calibrating new channel boundaries as a function of the number of emissions for the specific energy level channels within the first set of boundaries.

18 Claims, 5 Drawing Figures

METHOD AND DEVICE FOR MEASURING GAMMA RADIATION

BACKGROUND

1. Field of the Invention

This invention relates to the measurement of gamma radiation and more specifically to the energy calibration and stabilization of devices for measuring gamma radiation from potassium, uranium, and thorium.

2. Description of the Prior Art

Subsurface gamma ray spectroscopy is an outgrowth of the recording and analysis of natural gamma ray measurements that has occurred since approximately the 1930's. Specifically, subsurface gamma radiation is measured to provide geophysical information of the surrounding subsurface areas. Such information is used in the exploration for petroleum and natural gas.

Historically, three processes have been used to detect and measure gamma radiation. They are photoelectric absorption, Compton scattering and/or pair production. Instruments which embody these processes for measuring gamma radiation include magnetic spectrometers, scintillation spectrometers, proportional gas counters and semiconductors with solid state counters. The present invention uses a CsI (Na) detector in conjunction with a PM tube and appropriate amplifier and digital electronics to produce a pulse height distribution representing the subsurface gamma ray energy spectrum. The scintillation detector and PM tube have been used extensively recently for the measurement of gamma radiation and generates the pulse height spectrum by producing a voltage pulse output whose magnitude is proportional to the energy of the secondary electrons emitted by the gamma ray interaction in the scintillation detector.

Subsurface gamma ray spectroscopy is used to determine the amounts of potassium, uranium and thorium concentrations that naturally occur in geological formations at different subsurface locations. Measurements of gamma radiations from these elements is possible because these elements are associated with radioactive isotopes that emit gamma radiations at characteristics energies. The amount of each element present within a formation can be determined by its contribution to the gamma ray flux at a given energy. Measuring gamma radiation of these specific element concentrations is known as spectral stripping which refers to the subtraction of the contribution of unwanted elements within an energy window, including upper and lower boundaries, set to encompass the characteristic energy(s) of the desired element within the gamma ray energy spectrum. However, measurements of these elements by this method may be complicated by the fact that the energy of a gamma ray photon can be degraded as it passes through matter due to Compton scattering. The consequences are that a photon originally emitted at some given energy within the formation may end up being recorded at a different energy within the measuring device. A further complication is caused by the finite resolution of the gamma ray detection device resulting in a possible smearing of the original photon energy even if the photon energy does reach the detecting device without Compton scattering. Because of these factors, spectral stripping is accomplished in practice by calibrating the tool initially in an artificial formation with known concentrations of potassium, uranium and thorium under standard conditions.

Additionally, energy calibration of the spectrum is continually required while the detection system is traversing subsurface formations because of heat and other environmental factors affecting the measuring device. This continual energy calibration allows the correct placement of energy windows for the purpose of spectral stripping. Traditionally, when the measuring device is underground (or downhole) calibration has been performed by including a known radiating source with the measuring device. However, if the calibrating source emits radiation in the energy range of the potassium, uranium and thorium measured radiation, the calibrating source will corrupt the radiation measurements. If a radiation source is used that emits radiation far away from the energies to be measured, calibration of the measuring device at the potassium, uranium and thorium energy levels is questionable due to multiplied inaccuracies.

The object of the present invention is to maintain the energy calibration of the stripping windows during downhole radiation for measurements of potassium, uranium and thorium concentrations by iteratively recomputing the stripping window boundaries by locating and tracking a naturally occurring spectral peak, such as potassium, at a known energy.

SUMMARY OF THE INVENTION

In accordance with the present invention a method for determining the centroid of a gamma radiation spectral peak is provided that includes the steps of determining a minimum and maximum number of counts within a preselected multiple channel energy range, determining the channel having the maximum number of counts and a channel having approximately one-half of the maximum number of counts, determining a channel representing the background counts, computing the peak centroid channel from a relationship between the channel having one-half of the maximum number of counts and the channel representing the maximum number of counts and the background counts, computing a channel to energy conversion factor, computing stripping window boundary range channels by multiplying the channel to energy conversion factor by a constant representing the minimum energy range value and a constant representing the maximum energy range value.

In one embodiment of the present invention the above method includes the step of computing the channel to energy conversion factor having the step of dividing the peak energy centroid channel by a known spectral peak energy constant. Also the step for computing the peak energy centroid channel includes the step of dividing the channel having one-half of the maximum number of counts by a quantity including a constant times the square root of the natural logrithm of the ratio of the maximum number of counts minus the background counts divided by the counts within the channel having approximately one-half of the maximum number of counts adjusted by the background counts. Also, in this embodiment, a constant representing the resolution factor of the measuring device is used in conjunction with the channel having approximately one-half of the maximum number of counts and the channel representing the background energy.

In another embodiment of the invention, a method for calibrating a device for measuring peak gamma radiation within a multiple channel energy spectrum measurement range is provided that includes the steps of determining an initial minimum count channel and an initial maximum count channel within the range, determining whether a peak has been detected within the range by the analysis of the relationship between the counts of the minimum and maximum count channels respectively. Upon determining that a peak has been detected, determining a first channel having approximately one-half of the maximum number of counts, determining a second channel representing the background energy, and computing a peak energy centroid channel from the first channel and the second channel, and then computing a channel to energy conversion factor from the peak energy centroid channel. The next step is computing lower and upper calibrated measurement range channels respectively by multiplying the channel to energy conversion factor by a first constant representing the minimum energy range value and a second constant representing the maximum energy range value, and finally determining the channel having the maximum count within the lower and upper calibrated measurement range channels.

Also in this embodiment, the method includes steps of determining a minimum and maximum number of counts within the lower and upper calibrated measurement range channels and repeating the prior steps for the new channels containing the minimum and maximum number of counts within the lower and upper calibrated measurement range channels. This method further includes the step of repeating the calibration periodically.

A further embodiment includes having the energy spectrum measurement range include the measurement range for potassium having a lower range limit of approximately 1.37 MeV and an upper range limit of approximately 1.57 MeV. In this embodiment, the determined channel having the maximum count within the calibrated measurement range channels is used to determine second and third calibrated measurement range channels for the measurement of gamma radiation from uranium or thorium.

Alternatively, a method is presented as above except that the energy spectrum measurement range includes the measurement range for thorium having a lower range limit of approximately 2.30 MeV and an upper range limit of approximately 2.80 MeV with the determined channel having the maximum count within the calibrated measurement range channel being used to determine second and third calibrated measurement range channels for the measurement of gamma radiation from potassium and uranium.

A still further embodiment is provided that includes an apparatus for measuring gamma radiation including a device for detecting gamma radiation emission and for producing an electrical signal of a magnitude proportional to the level of energy of the emission and connected to a conversion device for transmitting a digital word containing the emission energy level. The conversion device is connected to a computational device that receives this digital word and computes the number of emissions for specific energy level channels within a first set of boundaries and then calibrates a new set of boundaries as a function of the numbers of emissions received for the specific energy level channels.

In a further embodiment of the gamma radiation measuring apparatus, a sodium activated cesium iodide crystal is connected to a photomultiplier tube with the combination enclosed in a Dewar vacuum flask is provided as the downhole measuring device.

BRIEF DESCRIPTION OF THE DRAWINGS

The novel features believed characteristic of the invention are set forth in the claims. The invention itself, however, as well as other features and advantages thereof will be best understood by reference to the detailed descriptions that will follow when read in conjunction with the accompanying drawings, wherein:

DETAILED DESCRIPTION OF THE PREFERRED EMBODIMENT

The present invention includes a measurement tool used in logging data for deep petroleum and natural gas well holes. This tool performs measurement of gamma radiation emitted from geological formations and performs pulse height analysis from the detected radiation. The information gathered by this tool is used by geologists to determine amounts of shale and clay and other information about the geological formations surrounding the wellhole. The tool is actually lowered down the wellhole and measurements are performed as the tool is raised.

The downhole portion of the logging tool includes a two inch diameter by twelve inch long sodium activated cesium iodide crystal which is connected to a photomultiplier tube. This cesium iodide crystal emits light when the crystal receives gamma radiation. The amount of light emitted by the crystal is proportional to the energy of the radiation it receives. The photomultiplier tube is connected to circuitry which converts this light into one of two hundred fifty-six channels of pulse height data which is transmitted to the surface. At the surface a computer receives this data and performs real time and post processing analysis of the data.

Figure 1:
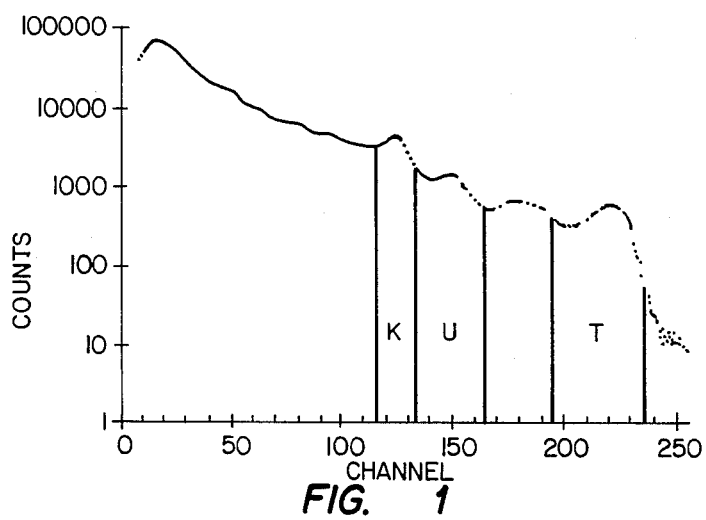
FIG. 1 is a graph representing the measurement of gamma radiation for potassium, uranium and thorium.

In normal operation, the two hundred fifty-six channel data are analyzed by the computer in terms of three energy windows which results in a data output displaying concentrations of potassium, uranium and thorium. Each channel of the two hundred fifty-six channel output represents a specific energy level. Each word received by the computer represents the occurrence of radiation within one of the two hundred fifty-six channels of energy. A typical output is illustrated in graph form in FIG. 1. FIG. 1 illustrates the energy windows for potassium (K), uranium (U) and thorium (T) plotted on the graph.

Temperature stability for the downhole tool is provided by including the sodium activated cesium iodide crystal and multiplier in a stainless steel Dewar flask. The invention further includes a computer algorithm that is performed to provide additional stabilization of the data.

Figure 2:
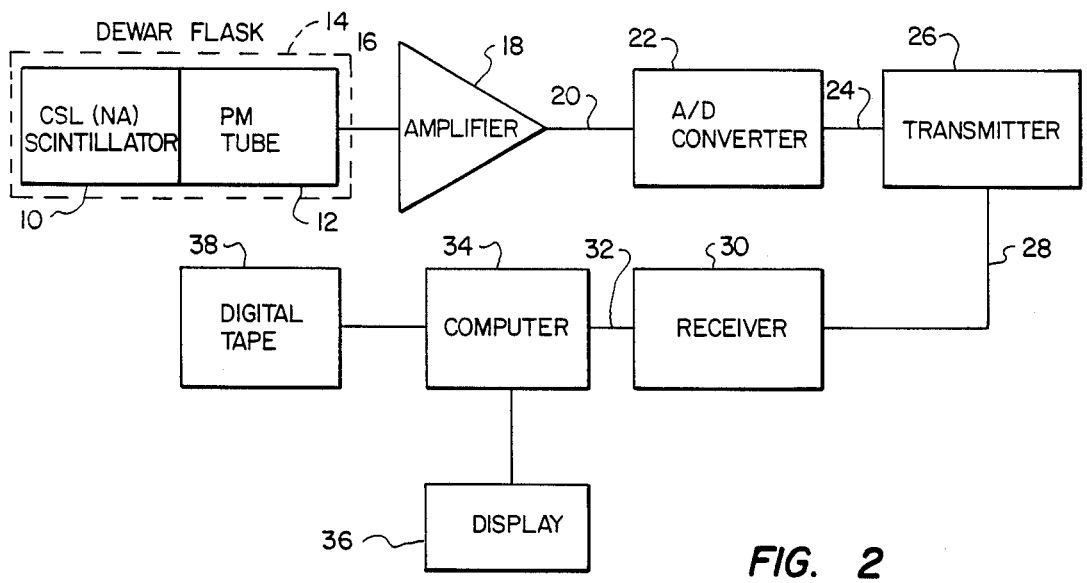
FIG. 2 is a block diagram of the invention.

FIG. 2 illustrates a block diagram of the invention. The sodium activated cesium iodide crystal scintillator 10 is illustrated connected to the photomultiplier tube 12. The specific size of the sodium activated cesium iodide crystal together with density provide improved detection efficiency over conventional sodium iodide scintillators. The crystal is optically coupled to the photomultiplier tube to permit the photomultiplier tube to detect light emissions within the crystal which result when gamma radiation is received by the crystal. The output of the photomultiplier tube 12 is a charge output that is input via line 16 to an amplifier 18. The cesium iodide crystal 10 and photomultiplier tube are contained within a Dewar flask 14 to provide initial temperature stabilization.

The charge output of the photomultiplier tube 12 is proportional to the amount of light received by the photomultiplier tube 12 from the crystal 10 which is proportional to the energy of the received gamma radiation. The charge output from the photomultiplier tube 12 is converted by amplifier 10 into a voltage output on line 20 which is input to an analog to digital converter 22. The output of the analog to digital converter 22 is an 8 bit word. Since the input to the analog to digital converter is an indication of the energy level of the received radiation, the output of the analog to digital converter 22 is a binary number (0-255) that represents the energy level of the radiation received. This 8 bit output on line 24 is transmitted on line 28 by transmitter 26 to the receiver 30 which is interfaced via line 32 to a computer 34.

In one embodiment, the value of the 8 bit word is used to specify an address in the memory of computer 34. Each time a word is transmitted, the contents of its respective memory location is incremented. Therefore, after a run, the computer memory contains 256 memory locations which each contain a number of counts or occurrences of these specific energy levels for the 256 channels energy range. Computer 34 is connected to a display 36 and digital magnetic tape device 38 for displaying and recording the data received and data analyzed.

The computer 34 performs spectral stripping analysis and stabilization analysis that results in the outputs consisting of potassium, uranium and thorium concentrations.

While temperature stability is initially provided by the Dewar flask (a vacuum flask), the computer 34 performs a special peak search algorithm to determine the peak centroids for low counting rates and further for determining the stripping window boundaries during a logging run. The recalibration of the stripping window boundaries provides additional temperature stability. It should be understood that the Dewar flask, which is similar to a vacuum bottle, does not actually prevent an increase in temperature of the downhole logging tool but merely slows down the warming process to allow the computer algorithm to stabilize the data by recalibrating the elemental stripping window boundary channels so that the true elemental peak centroid can be detected.

The initial calibration of the downhole portion of the measuring device is performed by placing a thorium source next to the detector assembly. The transmissions of the detector assembly (which consists of the crystal 10, photomultiplier tube 12, amplifier 18, analog to digital converter 22, and transmitter 26) are input to computer 34 for determining the thorium centroid. The stripping windows for potassium, uranium and thorium are then computed. It should be understood that the actual stripping window computation results in a determination of the specific channel boundaries for the stripping windows as is illustrated in FIG. 1. The stripping windows are approximately centered at the energies of potassium, uranium and thorium of magnitudes 1.46, 1.76 and 2.615 MeV respectively. It should be apparent from FIG. 1, that if any type of drift occurs such that the stripping window boundaries shift laterally due to temperature or other environmental conditions, the measurements for the concentrations of these three elements may be erroneous. Therefore, the stabilization algorithm in the computer 34 is performed to insure that the stripping window boundaries are properly located.

Figure 3:
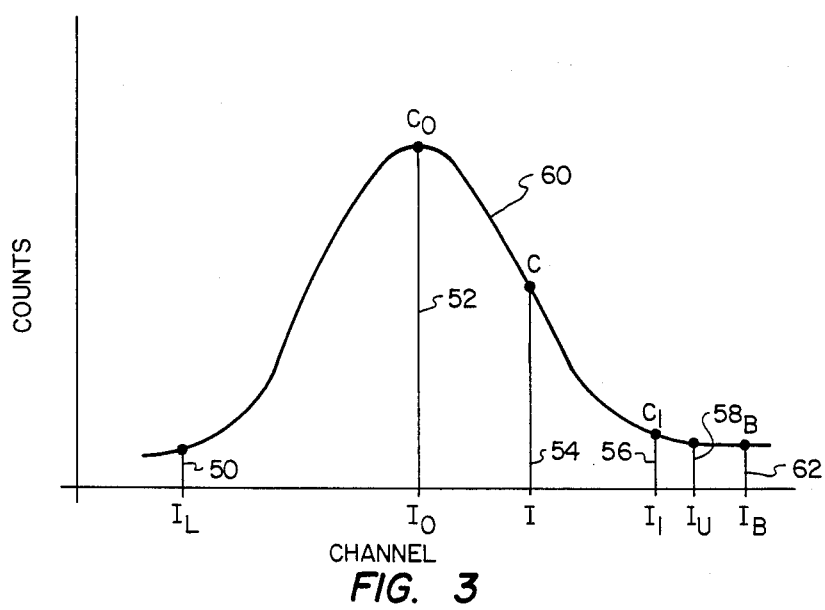
FIG. 3 is a diagram of a single peak within a single set of stripping window boundaries.

FIG. 3 is an illustration of data from a single elemental stripping window. Lines 50 and 58 represent the lower and upper stripping window boundaries as determined by initial calibration.

Figure 4:
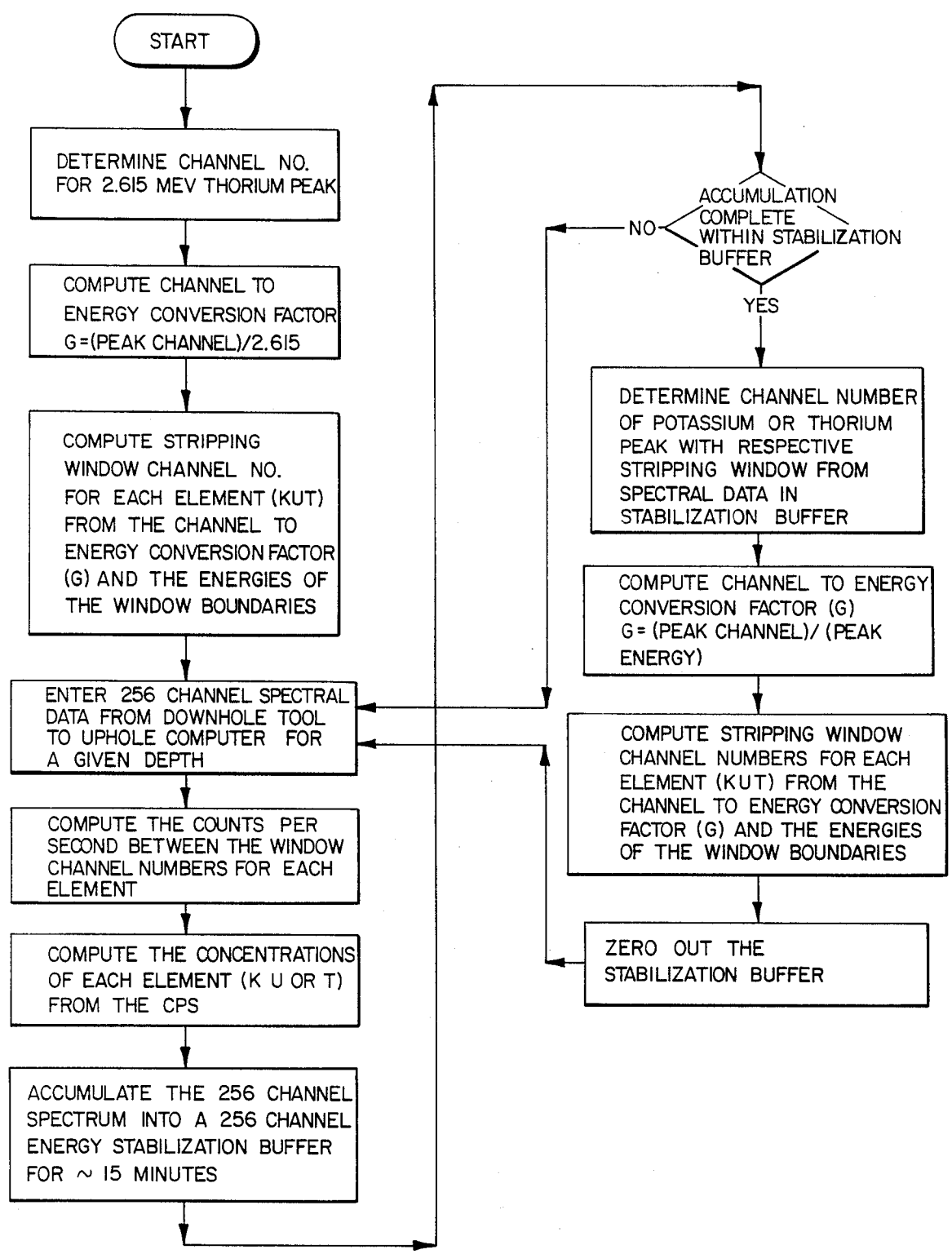
FIG. 4 is a flowchart of an algorithm used to record gamma radiation within the stripping window boundaries.

FIG. 4 is a block diagram of the algorithm that is used to determine potassium, uranium and thorium concentrations. Initially, the downhole logging tool is calibrated and the initial calibration data is entered. The stripping window boundaries are then determined and then input. The received data computed and the potassium, uranium and thorium concentrations are determined within the specific stripping windows. This sequence is continued until all of the data has been analyzed.

The step of computing elemental concentrations includes the step of determining the stripping window boundaries and includes a method that involves searching the spectral data for maximum and minimum counts and computing the peak channel number within a present range of channels that encompasses a naturally occurring peak.

Initially, the spectral peaks of these boundaries are set for the energy levels of potassium at 1.46 MeV or thorium at 2.615 MeV. When these maximum and minimum values within the selected ranges have been determined, these values are input to a special algorithm which computes the spectral peak centroid to a high degree of statistical accuracy. The centroid is computed in terms of the actual channel number of the downhole logging tool, but since the energy of the peaks are known and since the detection system has a linear response to incoming gamma ray energy, a relationship can be obtained which permits the calibration of the spectrum (or received data) in terms of energy.

The result in energy calibration of the gamma ray spectrum enables the determination of the channel boundaries of the stripping windows within the spectrum for the next iteration of measurements. These windows in turn are used to compute the concentrations of potassium, thorium and uranium which naturally occur in the earth formations as previously discussed. This procedure is repeated periodically during the time of detection while the downhole logging tool is transmitting data. The time interval between each energy calibration is used to accumulate the spectral data for stabilization purposes taken at the measurement points along the borehole travel.

Each of the spectral stripping windows for potassium, uranium and thorium of FIG. 1 will include data having a peak that can be detected. In order to explain the elemental window strip boundary algorithm, the analysis of a single stripping window will be discussed in detail. In actual practice, either the potassium or thorium windows is used with the following algorithm. The results of the algorithm is then used to determine the stripping window boundaries for the other two elements.

Figure 5:
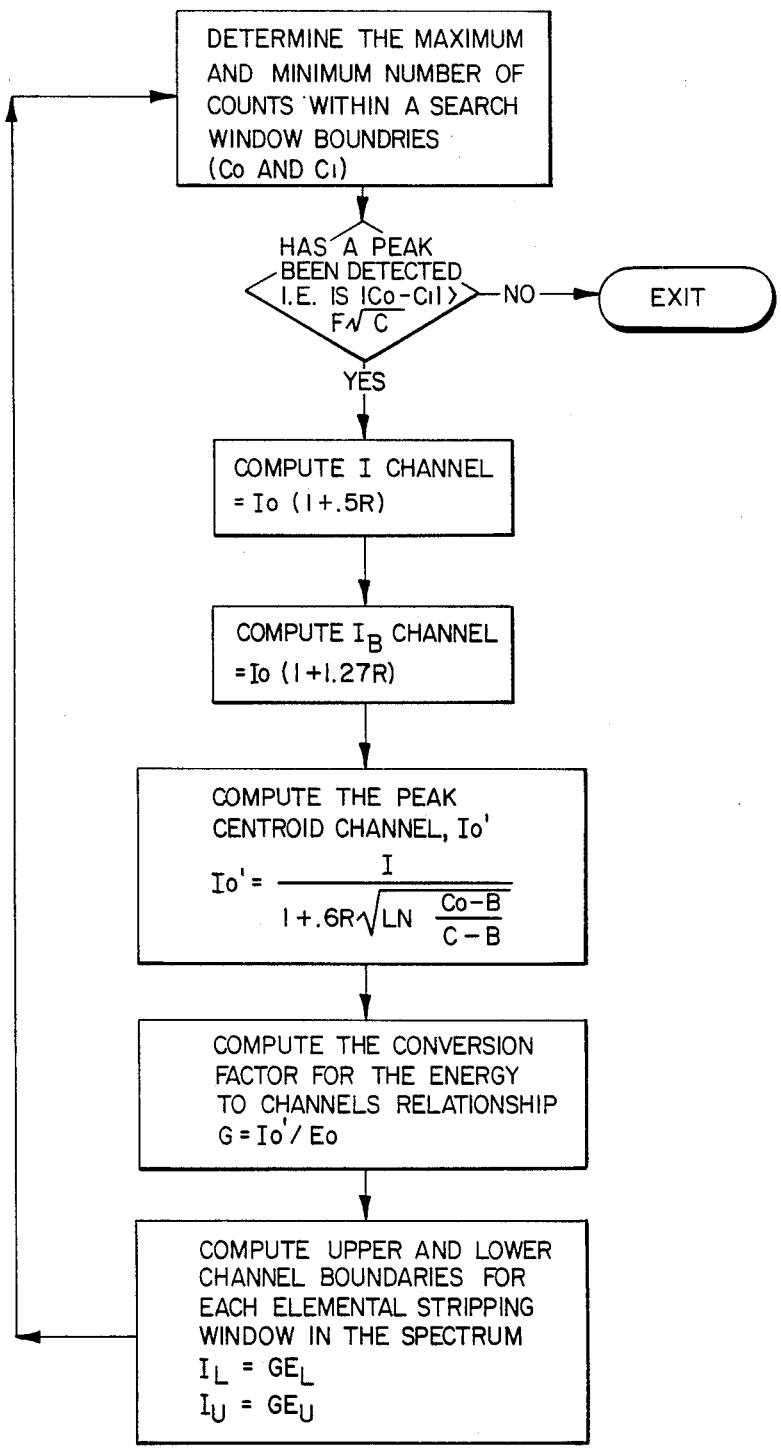
FIG. 5 is a flowchart of an algorithm used to recalibrate the stripping window boundaries.

FIG. 5 illustrates a flowchart of the algorithm to determine the boundaries for an elemental stripping window such as illustrated in FIG. 4. The first step in FIG. 5, is to determine the minimum and maximum number of counts within the search window boundaries. Looking at FIG. 3 as an example, the maximum number of counts occurs at a line 52 and the minimum number of counts at line 56 within the boundaries of lines 50 and 58. Line 52 indicates that the maximum number of counts $C_0$ occurs at channel $I_0$. Likewise, the minimum number of counts $C_1$ occur at channel $I_1$.

The next step in the algorithm is to determine if a peak has been detected. A peak has been detected if the magnitude of the maximum number of counts minus the minimum number of counts is greater than 7 times the square root of the minimum number of counts. This is a simple statistical test based on an assumed Poisson nature of the curve. If a peak has not been detected, then an exit is made from the algorithm until statistically significant data is accumulated. If a peak has been detected, then the I channel is computed which is equal to the maximum channel times the quantity 1 plus 0.5R where R is the crystal resolution at the peak energy for that specific stripping window. The sodium activated cesium iodide crystal has a channel resolution factor of 0.07 at the thorium energy. I is represented in FIG. 3 by line 54 and represents a point on the curve 60 having a maximum slope. Additionally, the use of this point minimizes the statistical error in determining the peak centroid.

The next step is determining the Compton background represented by channel $I_b$ which is equal to $I_0$ times the quantity of 1 plus 1.27R where R is the crystal resolution at the peak energy. The peak centroid channel $I_0$ prime is then determined by solving the equation for $I_0$ prime as illustrated in FIG. 5. Note that $C_0$ is the actual number of counts for channel $I_0$. C is the number of counts for channel I and B is the number of counts for the channel $I_b$.

The next step is to determine the energy to channels conversion factor. This is determined by dividing the peak centroid channel $I_0'$ by $E_0$ which represents the energy peak for the specific spectral peak of the elemental strip window. For potassium $E_0$ would equal 1.46 MeV and for thorium $E_0$ would equal 2.615 MeV.

The next step is to determine the lower and upper boundary channels for the stripping window. This is accomplished by multiplying the energy level for the lower boundary and for the upper boundary respectively by the energy to channels conversion factor. For potassium the lower boundary is 1.37 MeV and the upper boundary is 1.57 MeV, for uranium 1.58 to 1.95 MeV, and for thorium the lower boundary is 2.3 MeV and the upper boundary is 2.8 MeV.

This procedure is periodically repeated during the logging run using the adjusted upper and lower boundary channels for the spectral window. The spectral window calibration for a specific element such as potassium will yield the energy to channels conversion factor that is used to determine the elemental stripping window boundaries for the other two elements. That is, the conversion factor G obtained from the potassium peak, can be used to determine the channel boundaries for the uranium and thorium stripping windows since it is known that the uranium stripping lower and upper energy boundaries are 1.58 MeV and 1.95 MeV respectively and that the lower and upper energy boundaries for the thorium stripping window is 2.3 MeV and 2.8 MeV respectively.

Table I is a computer listing of the stabilizing algorithm.

Although preferred embodiments of the invention have been described in detail, it is to be understood that various changes, substitutions and alterations can be made therein without departing from the scope and spirit of the invention as defined by the appended claims.

TABLE I

| Line | | Code |
|---|---|---|
| 3673 | Find: | I=I2 |
| 3674 | Line__1: | Max=N(I) |
| 3676 | Line__2: | IF ABS(Max−N(I)<7*SQR(N(I))) THEN |
| 3677 | | I=I−1 |
| 3679 | | IF N(I)>Max THEN |
| 3680 | | Max=N(I) |
| 3681 | | I0=I |
| 3682 | | END IF |
| 3684 | | IF I<I1 THEN |
| 3685 | | PRINT "PEAK NOT FOUND" |
| 3686 | | PRINT |
| 3687 | | PRINT |
| 3688 | | PRINT |
| 3689 | | RETURN |
| 3691 | | END IF |
| 3692 | | GOTO Line__2 |
| 3694 | | END IF |
| 3695 | Line__3: | I=I+1 |
| 3696 | | Bg=N(I0*(1+1.27*Re)) |
| 3698 | | IF I>I0 AND Max−N(I)>.5*(Max−Bg) THEN |
| 3699 | | X0=I/(1+.6*Re*SQR(LOG((Max−Bg)/N(I)−Bg)))) |
| 3700 | | Sx=SQR(Max/(Max−Bg) 2+N(I)−Bg) 2+Bg*((Max−N(I))/((N(I)−Bg)*(Max−Bg))) 2) |
| 3701 | | Sx=.5*I*.6*Re*Sx |
| 3702 | | Dx=Sx/((1+.6*Re*SQR(LOG((Max−Bg)/(N(I)−Bg)))) 2*SQR(LOG((Max−Bg)/N(I)−Bg))) |
| 3704 | | !SIGMA=.8493*(I−I0) |
| 3705 | | PRINT "I0=",X0 |
| 3706 | | PRINT "ERROR=",Dx |
| 3707 | | PRINT USING "2/" |
| 3708 | | RETURN |
| 3709 | | END IF |
| 3710 | | GOTO Line__3 |

What is claimed is:

1. A method of measuring gamma radiation comprising:
   (a) determining a minimum and a maximum number of counts within a preselected multiple channel energy spectrum measurement range having a lower boundary channel corresponding to a selected minimum energy value and an upper boundary channel corresponding to a selected maximum energy value;
   (b) determining a channel having approximately one-half of the maximum number of counts;
   (c) determining a channel representing Compton background energy;
   (d) computing a peak energy centroid channel from the relationship between the channel having one-half of the maximum number of counts and the channel representing the Compton background energy;
   (e) computing a channel to energy conversion factor; and
   (f) computing calibrated lower and upper boundary channels, respectively, by multiplying the channel to energy conversion factor by the selected minimum energy value and the selected maximum energy value 2. The method of claim 1 wherein said step for computing the energy to channel conversion factor includes the step of dividing the peak energy centroid channel by a known spectral peak energy constant.

3. A method according to claim 2 wherein the step for computing the peak energy centroid channel includes the step of dividing the channel having one-half of the maximum number of counts by a quantity including a constant times the square root of the natural logarithm of the ratio of the maximum number of counts minus the Compton background divided by the counts within the channel having approximately one-half the maximum number of counts adjusted by the Compton background.

4. A method according to claim 3 wherein the channel having approximately one-half of the maximum number of counts is determined by multiplying the channel with the maximum number of counts times a known constant representing a resolution factor.

5. A method according to claim 4 wherein said step of determining the channel representing the Compton background energy includes the multiplying of the channel having the maximum number of counts by a second constant representing a resolution factor.

6. A method for calibrating a device for measuring gamma radiation within a multiple channel energy spectrum measurement range having lower and upper channels corresponding, respectively, to minimum and maximum energy values of the energy spectrum, said method comprising:
 (a) determining a minimum count channel and a maximum count channel within the range;
 (b) determining whether a peak has been detected within the range by the relationship between the counts of the minimum and maximum count channels;
 (c) upon determining that a peak has been detected, determining a first channel having approximately one-half of the maximum number of counts;
 (d) determining a second channel representing Compton background energy;
 (e) computing a peak energy centroid channel from the first channel and the second channel;
 (f) computing a channel to energy conversion factor from the peak energy centroid channel; and
 (g) computing lower and upper calibrated measurement range channels respectively by multiplying the energy to channel conversion factor by the minimum energy value and the maximum energy value 7. A method according to claim 6 further including steps:
 (h) determining a minimum and a maximum number of counts within the lower and upper calibrated measurement range channels; and
 (i) repeating steps (b) through (g)

8. A method according to claim 7 wherein steps (b) through (i) are repeated periodically for calibrating the measuring device.

9. A method according to claim 8 wherein said energy spectrum measurement range includes a measurement range for potassium having a minimum energy value of approximately 1.37 MeV and maximum energy value approximately 1.57 MeV.

10. A method according to claim 9 wherein the energy to channel conversion factor is used to determine second and third calibrated measurement range channels for the measurement of gamma radiation from uranium and thorium.

11. A method according to claim 8 wherein said energy spectrum measurement range includes a measurement range for thorium having a minimum energy value of approximately 2.30 MeV and a maximum energy value of approximately 2.80 MeV.

12. A method according to claim 11 wherein the energy to channel conversion factor is used to determine second and third calibrated measurement range channels for the measurement of gamma radiation from potassium and uranium.

13. An apparatus for measuring gamma radiation comprising:
 means for detecting gamma radiation emissions and for producing electrical signal each of said signals being of a magnitude proportional to a level of energy of each emission;
 conversion means for converting the electrical signals produced by the detecting means to digital words each of said words corresponding to a particular emission energy level;
 means for counting the number of words corresponding to each emission energy level within a gamma ray stripping window having a lower boundary word corresponding to a lower boundary energy level and an upper boundary word corresponding to an upper boundary energy level;
 means for computing a word to energy conversion factor;
 means for computing a stabilized lower boundary word by multiplying the lower boundary energy level by the word to energy conversion factor; and
 means for computing a stabilized upper boundary word by multiplying the upper boundary energy level by the word to energy conversion factor.

14. An apparatus for measuring gamma radiation according to claim 13 further including means for iteratively determining new calibrated upper and lower boundary words as a function of the number of emissions for the specific energy level words within the previous boundaries.

15. A device according to claim 14 wherein said detection means includes a sodium activated cesium iodide crystal connected to a photomultipler tube wherein said cesium iodide crystal and said photomultipler tube are located within a vacuum flask.

16. A method of stabilizing a gamma ray stripping window in a gamma ray energy spectrum, said stripping window having a lower boundary energy value, an upper boundary energy value, and a peak energy value positioned between said lower and upper boundary energy values, which comprises the steps of:
 partitioning said gamma ray energy spectrum into a plurality of channels, each of said channels corresponding to a particular energy within said spectrum;
 computing a channel to energy conversion factor;
 computing a stabilized lower boundary channel by multiplying the lower boundary energy value by the channel to energy conversion factor; and
 computing a stabilized upper boundary channel by multiplying the upper boundary energy value by the channel to energy conversion factor.

17. The method as claimed in claim 16, wherein said step of computing said channel to energy conversion factor includes the steps of:

determining a peak energy centroid channel; and dividing said peak energy centroid channel by said peak energy value.

18. The method as claimed in claim 17, wherein said step of determining said peak energy centroid channel includes the steps of:

determining a channel having a maximum number of counts within said stripping window;

determining a channel having approximately half the maximum number of counts;

determining a channel representing Compton background energy; and computing the peak energy centroid channel from a relationship between the channel having approximately half the maximum number of counts and the channel representing the Compton background energy.

* * * * *